(12) United States Patent
Zhang et al.

(10) Patent No.: US 11,671,475 B2
(45) Date of Patent: Jun. 6, 2023

(54) VERIFICATION OF DATA RECIPIENT

(71) Applicant: Alibaba Group Holding Limited, George Town (KY)

(72) Inventors: Qi Zhang, Hangzhou (CN); Yongliang Liu, Hangzhou (CN); Bing Wang, Hangzhou (CN)

(73) Assignee: Alibaba Group Holding Limited

( * ) Notice: Subject to any disclaimer, the term of this patent is extended or adjusted under 35 U.S.C. 154(b) by 173 days.

(21) Appl. No.: 16/820,360

(22) Filed: Mar. 16, 2020

(65) Prior Publication Data

US 2020/0304601 A1   Sep. 24, 2020

(30) Foreign Application Priority Data

Mar. 19, 2019   (CN) .......................... 201910207610.1

(51) Int. Cl.
  *H04L 29/06*   (2006.01)
  *H04L 67/01*   (2022.01)
  *H04L 9/08*    (2006.01)
  *H04L 9/40*    (2022.01)

(52) U.S. Cl.
  CPC ............ *H04L 67/01* (2022.05); *H04L 9/0822* (2013.01); *H04L 63/0861* (2013.01)

(58) Field of Classification Search
  CPC ..... H04L 63/0428; H04L 63/06; H04L 63/18; H04L 9/3215; H04L 67/42; H04L 9/3231; H04L 9/0894; H04L 63/0861; H04L 63/10; H04L 9/0822; H04L 9/0866; H04L 63/0853; H04L 2463/061; H04W 12/041; G06F 21/32; G06F 21/42; G06F 21/606
  See application file for complete search history.

(56) References Cited

U.S. PATENT DOCUMENTS

| | | | |
|---|---|---|---|
| 8,397,059 | B1 | 3/2013 | Ferguson |
| 8,782,396 | B2 | 7/2014 | Ziola |
| 9,195,822 | B2 | 11/2015 | Carlson |
| 9,659,160 | B2 | 5/2017 | Ligatti |
| 9,686,272 | B2 | 6/2017 | Blinn |
| 9,710,634 | B2 | 7/2017 | Fort |
| 10,009,378 | B2 | 6/2018 | Chiviendacz |
| 10,290,000 | B2 | 5/2019 | Kenderov |
| 10,541,993 | B2 | 1/2020 | Johansson |
| 10,572,875 | B2 | 2/2020 | Dominguez |
| 2003/0208693 | A1* | 11/2003 | Yoshida ............... H04L 67/565 713/150 |
| 2017/0357817 | A1* | 12/2017 | Tamura ............... G06F 21/6218 |
| 2017/0359717 | A1* | 12/2017 | Adler .................... H04W 12/42 |

(Continued)

*Primary Examiner* — Tri M Tran
(74) *Attorney, Agent, or Firm* — Van Pelt, Yi & James LLP

(57) ABSTRACT

Verification of a data recipient is disclosed, including: sending, to a server, a request for requested information, wherein the request includes identifying information associated with a user; receiving, from the server, at least two pieces of information over different transmission channels; sending, to the server, recovered security data that is generated based at least in part on the at least two pieces of information, wherein the server is configured to determine whether the recovered security data matches stored security data; receiving, from the server, protected requested information associated with the request; and using the recovered security data to recover unprotected requested information based at least in part on the protected requested information.

17 Claims, 15 Drawing Sheets

(56) References Cited

U.S. PATENT DOCUMENTS

| | | |
|---|---|---|
| 2018/0075452 A1 | 3/2018 | Weller |
| 2018/0198614 A1 | 7/2018 | Neumann |
| 2019/0036914 A1* | 1/2019 | Tzur-David ........ H04L 63/0846 |
| 2019/0066114 A1* | 2/2019 | Ross ........................ G06F 21/32 |
| 2020/0244459 A1* | 7/2020 | Hu ............................ G06T 1/005 |

* cited by examiner

VERIFICATION OF DATA RECIPIENT

CROSS REFERENCE TO OTHER APPLICATIONS

This application claims priority to People's Republic of China Patent Application No. 201910207610.1 entitled DATA PROCESSING METHOD, MEANS AND DEVICE filed Mar. 19, 2019 which is incorporated herein by reference for all purposes.

FIELD OF THE INVENTION

The present application relates to a field of computer technology. In particular, the present application relates to techniques for verifying a data recipient.

BACKGROUND OF THE INVENTION

As Internet technology continues to develop, many documents containing confidential information need to be sent from servers via the Internet to users. To ensure that unauthorized parties do not access the confidential information, the identities of users who wish to access such information must be verified before access is granted.

Conventionally, verification of a user is performed by sending a verification code to a user's phone or email. For example, the verification code is a six or four-digit number and it is sent over one channel (e.g., via a text message or an email). After the user sends the verification code back to the server, the server checks if the received verification code is correct. If the verification code is correct, then the server sends the requested document to the client device that is used by the user. However, the verification code information that is sent to the user over the single channel may easily be viewed by an authorized person, who may then access the confidential information as a result.

Therefore, conventional user identity verification lacks strong security protection and is also vulnerable to document leaks.

SUMMARY OF THE INVENTION

The present application discloses techniques comprising:
sending, to a server, a request for requested information, wherein the request includes identifying information associated with a user; receiving, from the server, at least two pieces of information over different transmission channels; sending, to the server, recovered security data that is generated based at least in part on the at least two pieces of information, wherein the server is configured to determine whether the recovered security data matches stored security data; receiving, from the server, protected requested information associated with the request; and using the recovered security data to recover unprotected requested information based at least in part on the protected requested information.

BRIEF DESCRIPTION OF THE DRAWINGS

Various embodiments of the invention are disclosed in the following detailed description and the accompanying drawings.

DETAILED DESCRIPTION

Figure 1A:
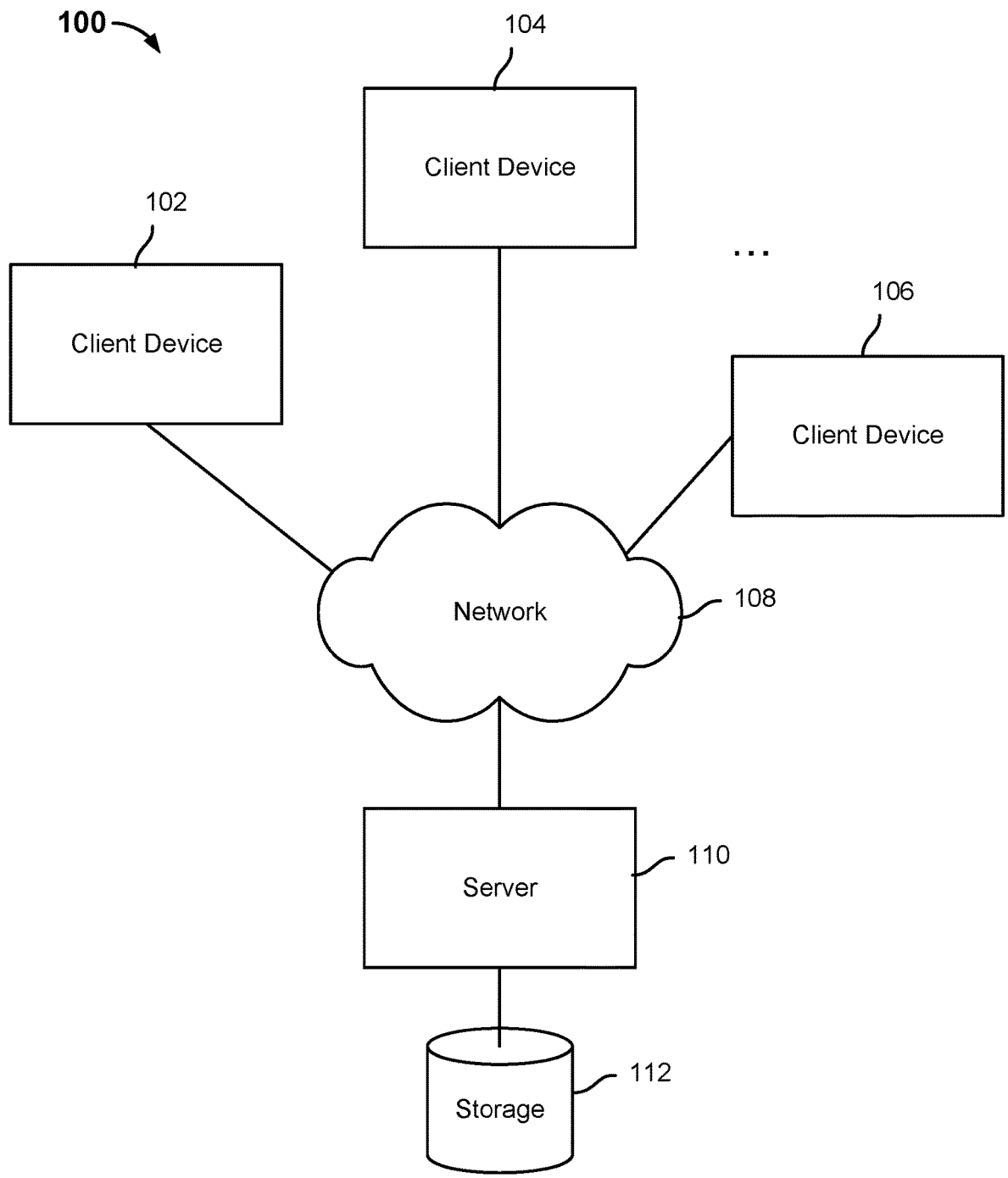
FIG. 1A is a diagram showing an embodiment of a system for providing verification of a data recipient.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The description below sets forth many specific details in order to facilitate full understanding of the present invention. However, the present invention can be realized in many forms other than those described here, and, without departing from the meaning of the present invention, persons skilled in the art can popularize it in similar forms. Therefore, the present invention is not limited by the specific embodiments disclosed below.

Embodiments of verification of a data recipient are described herein. A request for requested information is sent to a server from a client device. In various embodiments, "requested information" includes information that is confidential, sensitive, proprietary, or otherwise is only intended for a limited number of authorized users. The request includes identifying information associated with a user. A first piece of information is received at the client device from the server over a first transmission channel. A second piece of information is received at the client device from the server over a second transmission channel. In various embodiments, additional pieces of information may be received at the client device over additional transmission channels. In various embodiments, the transmission channels over which pieces of information are received at the client device from the server are different. In some embodiments, the first and second transmission channels may include email account(s), messaging application account(s), and text messaging account(s), for example, which are associated with the user (the potential recipient of sensitive data) that had initiated the request. Recovered security data that is generated based on the first and second pieces of information is sent to the server. In some embodiments, the first and second pieces of information are accessible to (e.g., able to be read and/or presented by) the client device if the user can authenticate his or her identity to the respective transmission channels over which they were sent. For example, the first and second transmission channels are associated with two different instant messaging applications for which the pieces of information sent from the server will only become visible at the client device if the user of the client device is able to authenticate (e.g., submit the correct, respective login credentials) into the applications. Once the first and second pieces of information are accessible, they are used (e.g., by a client application executing at the client device or the user) to generate recovered security data. For example, the recovered security data comprises an alphanumeric string. In some embodiments, the recovered security data is a key that is usable, either directly or indirectly, to recover unprotected requested information from protected requested information. For example, the protected requested information could be a protected document and the unprotected requested information that is to be recovered is the unprotected version of that document. Other examples of protected requested information include protected portions of documents and protected data streams. The server confirms whether the recovered security data that it had received from the client device matches the stored security data that it had sent to the client device over the at least two transmission channels. In the event that the server determines that the recovered security data matches the stored security data, a protected requested document associated with the request is then received from the server. In some embodiments, the protected document comprises an encrypted document, that is not intelligible (e.g., human-readable). The recovered security data is then used to recover an unprotected (e.g., human-readable) document from the protected document. In some embodiments, recovering an unprotected document from the protected document using the recovered security data includes using the recovered security data as a key to decrypt the protected (e.g., encrypted) document.

FIG. 1A is a diagram showing an embodiment of a system for providing verification of a data recipient. In the example, system 100 includes client device 102, client device 104, client device 106, network 108, server 110, and storage 112. Network 108 may include data and/or telecommunications networks. Each of client device 102, client device 104, client device 106, network 108, and server 110 may communicate to each other via network 108. Examples of each of the client devices 102, 104, and 106 may be a smart phone, a mobile device, a tablet device, a laptop computer, a desktop computer, and/or any networked computing device.

Server 110 is configured to store and manage the distribution of data that is stored at storage 112. Storage 112 may store documents with sensitive information that is only intended for certain recipients. Due to the sensitive nature of at least some of the documents that are managed by server 110 at storage 112, server 110 must verify that a recipient that had requested a certain document from storage 112 is actually a user that is authorized to view the document. As shown in FIG. 1A, server 110 is configured to distribute data to various client devices, including, but not limited to, client devices 102, 104, and 106.

Each of client devices 102, 104, and 106 is configured with a respective client application that is configured to communicate with server 110 (e.g., over network 108) to receive (e.g., sensitive) data from server 110. For example, the client application is downloaded from a corresponding website. In some embodiments, when a user uses one of client devices 102, 104, and 106 to interact with the sensitive data client application (e.g., after having downloaded the client application to the client device), the client application prompts the user to register himself or herself by submitting user identifying information as well as transmission channel information to server 110. For example, user identifying information may include the user's name, an enterprise/company with which the user is associated, a photo of an identification card of the user's, and an address associated with the user. In some embodiments, transmission channel information may include identifying information associated with the user's two or more communication channels. For example, identifying information associated with the user's two or more communication channels may include an email address associated with the user, a phone number associated with the user, and a handle or other account number of the user's with respect to a particular messaging platform. Server 110 is configured to store each user's set of submitted registration information that includes the identifying information and transmission channel information.

Sometime after having submitted the registration information, the user of each of client devices 102, 104, and 106 may use the client application that is executing at the user's respective client device to request sensitive data (e.g., documents) from server 110. For example, the user of a client device and the party that operates server 110 have a contractual relationship in which only that user or another authorized user is to receive data, from server 110, that may include proprietary information and that the user(s) have an obligation to not leak the received data to unauthorized parties. In some embodiments, prior to being able to request a document from server 110, the user of the client device must authenticate himself or herself at the client device via, e.g., submitting a biometric attribute. For example, the user must pass a facial recognition-based authentication process at the client device. Once the user is able to authenticate himself or herself at the client device, the client application sends a request for requested information to server 110. The request may include identifying information associated with the requesting user (e.g., that was stored locally at the client device).

In response to a request for requested information from a client device of client devices 102, 104, and 106, server 110 is configured to retrieve stored, at least, transmission channel information corresponding to the requesting user for which identifying information was included in the request. Server 110 is also configured to obtain stored security data to send to the client device of the requesting user. In some embodiments, the stored security data corresponds to the requested document. In some embodiments, the requested document comprises one or more documents that are associated with the requesting user. In some embodiments, the security data comprises a key (e.g., a decryption key comprising an alphanumeric string). Server 110 is configured to select at least two different transmission channels for which information is included in the stored transmission channel information corresponding to the requesting user. Examples of transmission channels include email, phone, and messaging applications, and can be accessed through, for example, email addresses, phone numbers, messaging account numbers, and messaging handles. Server 110 is configured to transmit the stored security data over the selected at least two transmission channels to the client device of the requesting user. For example, to send stored security data over a selected channel such as Messaging Platform Acme, then server 110 is configured to send data to a server associated with the Messaging Platform Acme and Messaging Platform Acme's server is configured to route the sent data to the client device associated with the user's transmission channel identifying information (e.g., user handle). In a first example, server 110 divides the security data into multiple pieces and then sends each piece (with a corresponding sequence number) over a corresponding transmission channel to the client device associated with the requesting user. In a second example, server 110 sends an encrypted version of the security data over a first transmission channel and then sends the decryption information for decrypting the encrypted security data over a second transmission channel.

Because the stored security data that is sent by server 110 is sent across at least two different transmission channels, only a user at the requesting client device that has authentication credentials for each application corresponding to each of the transmission channels is able to and/or grant the device login to the applications to access the pieces of information pertaining to the security data. For example, if a malicious party has obtained unauthorized access to some of but all of the transmission channels over which pieces of the security data are sent from the server, that malicious party is still not able to recover the security data. In some embodiments, either the user or the client application executing at the recipient client device is able to access all pieces of information associated with the security data at the client device. The obtained pieces of information are then used by the user or the client application executing at the device to generate recovered security data. For example, if server 110 had sent the security data as multiple pieces over multiple transmission channels, then the pieces are concatenated in their correct order to form the recovered security data. In another example, if server 110 had sent encrypted security data over a first transmission channel and the corresponding decryption information over a second transmission channel, then the decryption information is used (e.g., by the client application) to decrypt the received encrypted security data to recover the security data. The recovered security data is input into the client application that had initially requested sensitive information and the client application is configured to send the recovered security data to server 110. If the user at the requesting client device does not have the authentication credentials for each application corresponding to each of the transmission channels, then it is presumed that the user and/or the device is not able to log in to the applications to access the pieces of information pertaining to the security data and therefore, is not able to generate and send recovered security data back to server 110 to ultimately receive the requested document.

Server 110 is configured to compare the recovered security data that it had received from the client device to the stored security data. In the event that the recovered security data matches the stored security data, then server 110 would consider that the user (data recipient) at the client device has been successfully authenticated and would proceed to send the requested document to the client device. However, had the recovered security data not matched the stored security data, then server 110 would consider that the user (data recipient) at the client device has not been successfully authenticated and would not proceed to send the requested document to the client device. In various embodiments, the requested document is sent as a protected (e.g., encrypted) document. In some embodiments, the protection around the protected document can be undone using the security data.

The client device that receives the requested protected document is then configured to use the recovered security data to recover an unprotected (e.g., human readable) version of the document. In some embodiments, the recovered security data is a key or is usable to input, at the client device, into a function to generate a key that is then able to decrypt the encrypted document. The unprotected (e.g., decrypted) document may then be presented at the display screen of the client device. In some embodiments, prior to presenting the unprotected document, the unprotected document is also parsed. For example, parsing the unprotected document may include extracting portions of the document for certain media or text. Then, for example, the parsed out media/text may be programmatically populated into input fields of the client applications. In some embodiments, the client device is configured to add a pattern (e.g., watermark) to the unprotected document. For example, the pattern comprises identifying information associated with the user that had requested the document. As such, should the unprotected document be shared with another (e.g., unauthorized) user, then the pattern on the unprotected document will enable the identification of the user who leaked information. For example, the document was encrypted using a key associated with the security data.

As shown in FIG. 1A and as will be described in further detail below in various embodiments described herein, the authentication of a user that is requesting requested information is strengthened by the server transmitting information pertaining to security data across two or more transmission channels. Only after a user is able to log in using authentic credentials to applications or user interfaces corresponding to those transmission channels can the security data be successfully recovered at the client device. Furthermore, a document that is sent by the server is sent in a protected form. The protected document cannot be correctly made (e.g., human) readable unless the security data that is recovered at the client device is correct (e.g., matches the security data that is stored by and was sent from the server). This may be because the protection (e.g., encryption) around the document is generated by the server using the security data and as such, only correctly recovered security data can be used to undo the protection around the protected document to recover the human readable version of the document. All in all, various embodiments described herein improve the strength of authenticating a user that is seeking sensitive information and reduce the risk that requested data will be accessed by unauthorized parties.

Figure 1B:
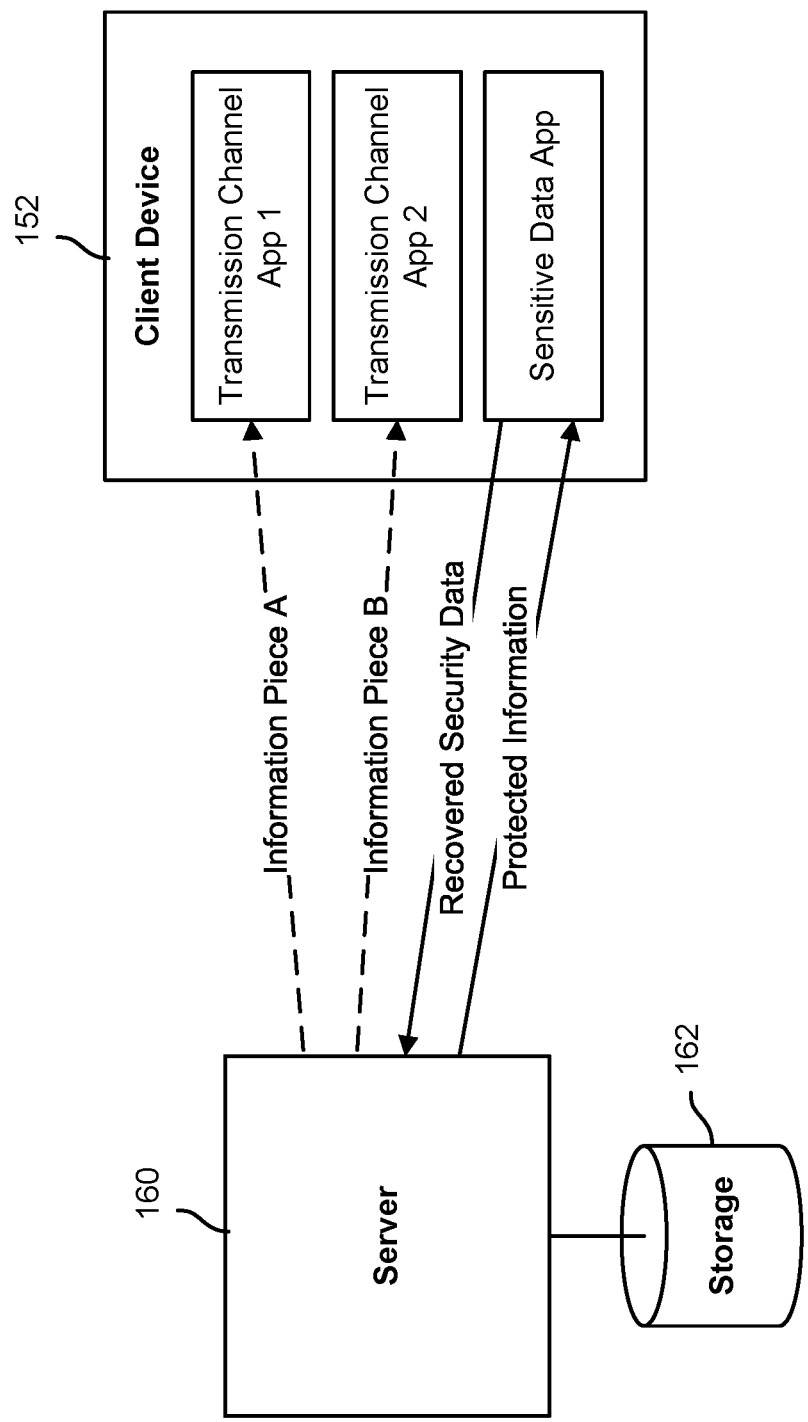
FIG. 1B is a diagram showing an example interaction between a server and a client device.

FIG. 1B is a diagram showing an example interaction between a server and a client device. In the example of FIG. 1B, client device 152 is configured to request requested information from server 160. In some embodiments, client device 152 may be implemented by any of client devices 102, 104, or 106 of FIG. 1A. In some embodiments, server 160 may be implemented by server 110 of FIG. 1A. To be able to request sensitive information from server 160, a user of client device 152 must first authenticate himself or herself with the Sensitive Data Application (which is also sometimes referred to as "App" or "app") that is executing at client device 152. For example, the user of client device 152 authenticates herself with the Sensitive Data Application by submitting a biometric attribute (e.g., a photo of the user's face, a pupil scan, or a fingerprint scan). Once the Sensitive Data App verifies that the received biometric attributes match a stored biometric attribute, the Sensitive Data App determines that the user is authenticated. After the user is authenticated with the Sensitive Data App that is executing at client device 152, the Sensitive Data App sends a request (not shown in the diagram) for sensitive information to server 160 on behalf of the authenticated user. The request includes at least identifying information associated with the authenticated user. After receiving the request, server 160 uses the identifying information associated with the authenticated user to obtain, from storage 162, stored transmission channel information associated with the user. For example, stored transmission channel information associated with the user includes the user's contact information (e.g., email addresses, phone numbers, user handles) on two or more different transmission channels such as, for example, email, phone, or messaging platforms. Server 160 may select at least two of such transmission channels to send stored security data to the user. Server 160 may obtain, from storage 162, stored security data that corresponds to the sensitive information that is requested by the user, for example. In one example approach, server 160 may divide the stored security data into as many pieces as there are selected transmission channels and then send each piece of the stored security data over a corresponding selected transmission channel to client device 152. In the specific example of FIG. 1B, the stored security data is divided into two pieces: Information Piece A and Information Piece B. Information Piece A is sent to the user's contact information over Transmission Channel 1 (not shown) to Transmission Channel App 1 and Information Piece B is sent to the user's contact information over Transmission Channel 2 (not shown) to Transmission Channel App 2. In the example of FIG. 1B, an instance of each of Transmission Channel App 1 and Transmission Channel App 2 is executing at client device 152. To recover Information Piece A, the user would need to be able to authenticate (e.g., provide the correct credentials) to Transmission Channel App 1 so that Transmission Channel App 1 would present the Information Piece A at a user interface. To recover Information Piece B, the user would need to be able to authenticate (e.g., provide the correct credentials) to Transmission Channel App 2 so that Transmission Channel App 2 would present the Information Piece B at a user interface. Therefore, the user or the Sensitive Data App is only able to access both Information Piece A and Information Piece B if he or she has the correct credentials to both Transmission Channel App 1 and Transmission Channel App 2.

Once the user or the Sensitive Data App successfully accesses both Information Piece A and Information Piece B respectively from Transmission Channel App 1 and Transmission Channel App 2, the user or the Sensitive Data App is able to generate the recovered security data using Information Piece A and Information Piece B. For example, Information Piece A and Information Piece B can be arranged in a known sequence and then concatenated to form the recovered security data. If the user had generated the recovered security data, then the user can input the recovered security data into the Sensitive Data App. Otherwise, the Sensitive Data App can programmatically generate the recovered security data by reading Information Piece A and Information Piece B respectively from Transmission Channel App 1 and Transmission Channel App 2 (after the user had successfully authenticated into Transmission Channel App 1 and Transmission Channel App 2). The Sensitive Data App executing at client device 152 would send the recovered security data to server 160. Server 160 is configured to compare the received recovered security data to the stored security data. If server 160 determines that the received recovered security data matches the stored security data, then server 160 is configured to send a successful match result to client device 152. Server 160 is also configured to send the requested information in a protected (e.g., encrypted) form over to client device 152. In response to receiving the successful match result from server 160, client device 152 is configured to use the recovered security data to recover the unprotected (e.g., human-readable) version of the requested information from the protected information that was received from server 160. For example, client device 152 is configured to obtain a decryption key using the recovered security data and then use this decryption key to decrypt the protected information, which was encrypted. For example, after client device 152 recovers the unprotected information, client device 152 is configured to parse the unprotected information and/or present at least a portion of it at a user interface.

Figure 2:
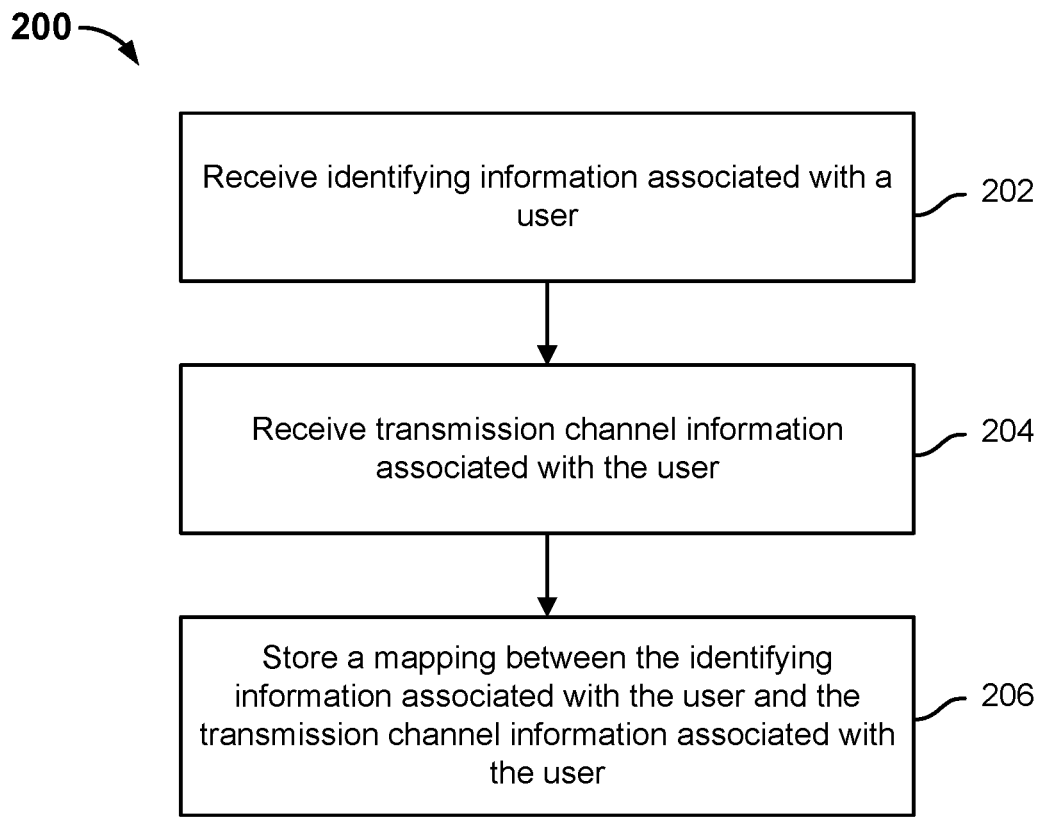
FIG. 2 is a flow diagram showing an embodiment of a process for receiving user registration information.

FIG. 2 is a flow diagram showing an embodiment of a process for receiving user registration information. In some embodiments, process 200 is implemented at server 110 of system 100 of FIG. 1A.

To eventually be able to request sensitive information from a server, the user must first perform registration with the service provided by the server. In some embodiments, the user is configured to download and open a client application associated with the server at a client device and input solicited registration information into a form user interface that is presented by the client device.

At 202, identifying information associated with a user is received. Examples of identifying information associated with a user include the user's name, the user's address, a photo of an identification card of the user, and identifying information associated with an enterprise with which the user is associated.

At 204, transmission channel information associated with the user is received. Transmission channel information includes the user's identifying information with respect to one or more communication platforms. Examples of transmission channel information include a phone number, an email address, and a messaging application handle. As will be described in further detail below, the transmission channel information can be used by the server to send information to the user across at least two channels.

At 206, a mapping between the identifying information associated with the user and the transmission channel information associated with the user is stored. The stored mapping between the identifying information associated with the user and the transmission channel information associated with the user may be used when a request for requested information is received from the user.

Figure 3:
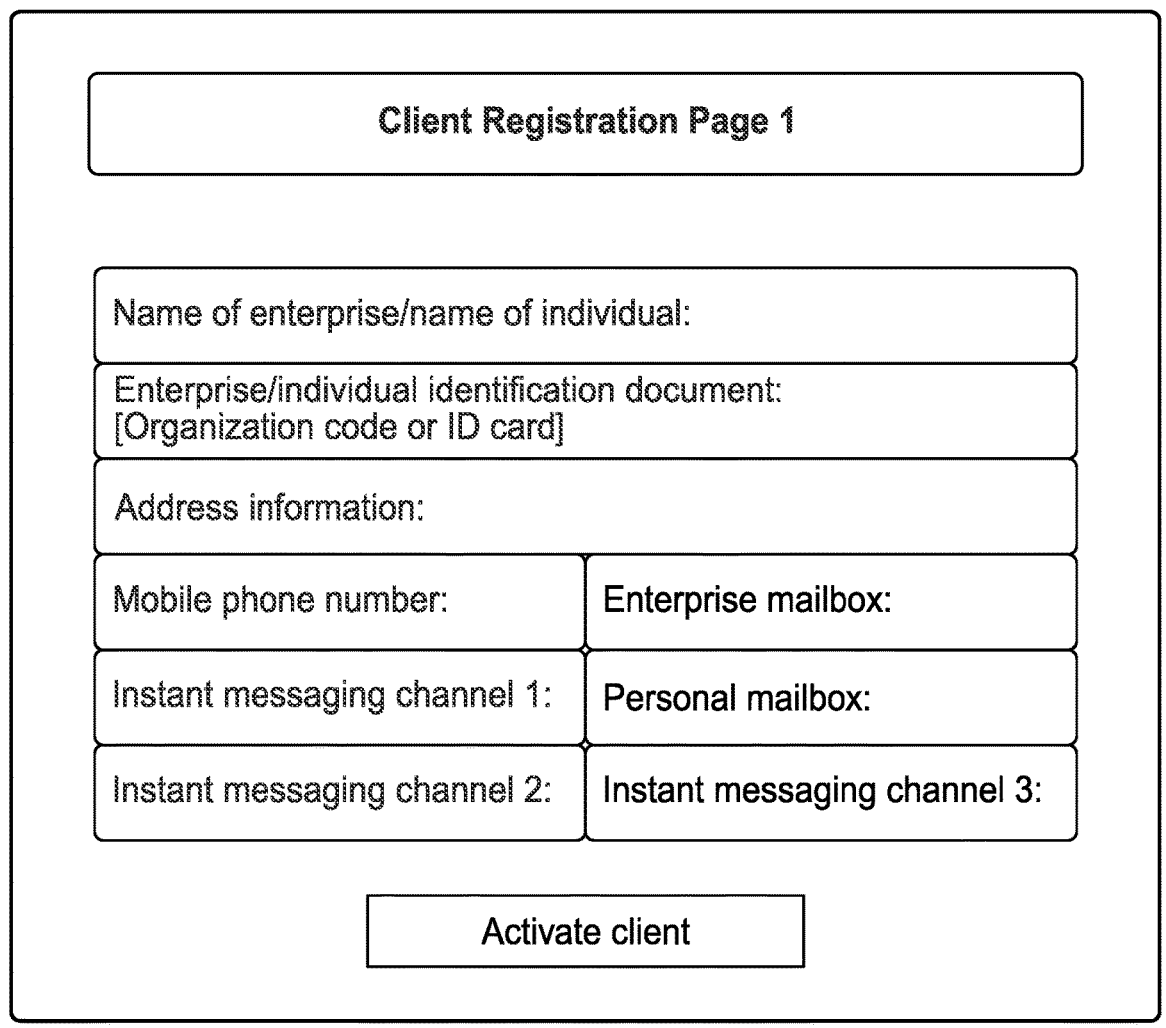
FIG. 3 is an example user interface for user registration that is presented by a client application executing at a client device.

FIG. 3 is an example user interface for user registration that is presented by a client application executing at a client device. In some embodiments, user interface 300 may be presented at a client device such as one or more of client devices 102, 104, and 106 of system 100 of FIG. 1A. As shown in the example of user interface 300, the user registration form may solicit user identifying information such as the fields of "Name of enterprise/name of individual," "Enterprise/individual identification document: [Organization code or ID card]," and "Address information." Also, as shown in the example of user interface 300, the user registration form may solicit transmission channel information such as the fields of "Mobile phone number," "Enterprise mailbox," "Instant messaging channel 1," "Personal mailbox," "Instant messaging channel 2," and "Instant messaging channel 3." For example, in the "Instant messaging channel 1" field, the user will input his or her information (e.g., a handle, a user name, or an account number) with respect to his or her account on the messaging platform associated with Instant messaging channel 1 so that the server can send data on that messaging platform to the user using the input information.

Figure 4:
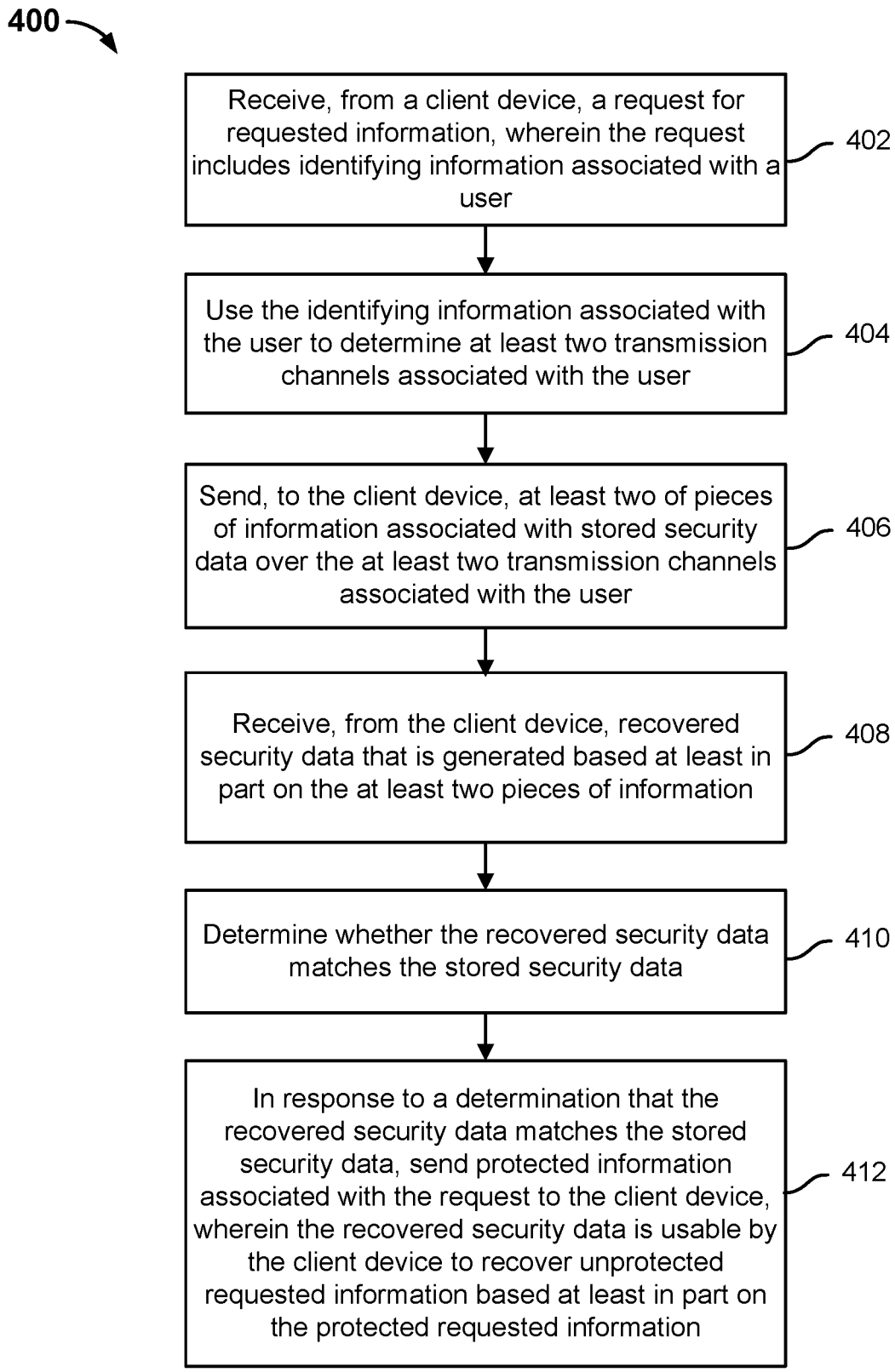
FIG. 4 is a flow diagram showing an embodiment of a process for providing sensitive data to a client device.

FIG. 4 is a flow diagram showing an embodiment of a process for providing sensitive data to a client device. In some embodiments, process 400 is implemented at server 110 of system 100 of FIG. 1A.

At 402, a request for requested information is received, wherein the request includes identifying information associated with a user. In some embodiments, before the request is sent to the server from the client device, the user must first authenticate himself or herself at the client device by submitting a biometric attribute such as a facial scan, a pupil scan, or a fingerprint, for example. Only after the client device determines that the submitted biometric attribute matches a stored biometric attribute does the client device send the request to the server.

In some embodiments, the website from which the client application may be downloaded provides a series of identity operations such as registration and verification before permitting downloading of the client. Another possibility is that the client application is first downloaded from the website. Then the client undergoes an activation operation using a series of identity information. It is also possible that both steps are carried out.

In some embodiments, the "requested information" comprises sensitive, confidential, and/or proprietary information.

At 404, the identifying information associated with the user is used to determine at least two transmission channels associated with the user. The identifying information associated with the user is used to determine transmission channel information that has been stored for the user in connection with registration.

At 406, at least two pieces of information associated with stored security data is sent to the client over the at least two transmission channels associated with the user.

The following are two example approaches that may be used when issuing information pieces of stored security data to the client device via the at least two transmission channels:

The first example approach is as follows: first divide the stored security data into at least two pieces. In some embodiments, the stored security data is divided into a predetermined number of pieces of information. In some embodiments, the stored security data is divided into as many pieces of information as there are different transmission channels for which information had been stored for the user. Then, a piece of each piece of information is sent to the user/client device over each transmission channel.

For example, the stored security data is the string of numbers "12345678." Also, for example, assume that the stored transmission channel information for the user includes information for a mobile phone, instant messaging channel 1, instant messaging channel 2, and instant messaging channel 3. In an example distribution approach: the "12" portion of the stored security data is sent via the mobile phone, the "34" portion of the stored security data is sent via instant messaging channel 1, the "56" portion of the stored security data is sent via instant messaging channel 2, and the "78" portion of the stored security data is sent via instant messaging channel 3. In some embodiments, each piece of information is sent with information that identifies their corresponding sequence number in the security data. In some embodiments, the sequence of a set of information pieces was agreed upon beforehand by the server and the client device. For example, the agreed upon sequence of information pieces in a set may be: the information piece received by instant messaging channel 1, the information piece received by instant messaging channel 2, and the information piece received by the mobile phone.

The second example approach is as follows: first encrypt the stored security data. Then, the encrypted security data is issued via a first transmission channel and the information that is to be used to decrypt the encrypted security data is issued via a second transmission channel.

For example, encrypted security data may be issued to the client device via instant messaging channel 1 and information used to decrypt encrypted security data may be issued via instant messaging channel 2.

At 408, recovered security data that is generated based at least in part on the at least two pieces of information is received.

If the user at the client device is the purported user that had issued the request, then the user should be able to authenticate into each respective application that corresponds to each transmission channel over which a piece of information was sent. Only by authenticating into each such application can each piece of information be read by the user and/or the client application that is executing at the client device and that is configured to obtain the sensitive data. After obtaining all of the pieces of information, the user or the client application that is configured to obtain the sensitive data is able to recover the sent security data. For example, recovering the security data using all of the pieces of information includes arranging the pieces of information in their corresponding sequential order to reconstruct the security data. In another example, recovering the security data using all of the pieces of information includes using the decryption information that is received at one transmission channel to decrypt the encrypted data that was received at another transmission channel.

At 410, whether the recovered security data matches the stored security data is determined.

For example, the recovered security data "12345678" that includes information pieces "12," "34," "56," and "78" is sent to the server. The server receives the recovered security data "12345678" that is sent by the client. The server then compares "12345678" to the sent security data information pieces and determines that they match. The server then sends the successful match result to the client device.

Where the recovered security data does not match the stored security data at the server is then inferred that the recipient of the pieces of information did not have access to the application that corresponds to each transmission channel and that the user may not be an authorized user that had previously registered with the server. When the recovered security data does not match the stored security data, the server sends a corresponding failed match result to the client device and also does not send the requested data to the client device.

At 412, in response to a determination that the recovered security data matches the stored security data, protected requested information associated with the request is sent to the client device, wherein the recovered security data is usable by the client device to recover unprotected requested information based at least in part on the protected requested information.

In some embodiments, the server may also encrypt a file that is requested by a client device and generate an encrypted document to further increase document security. The server may use any approach to encrypt a document. Two example approaches are described below:

The first example approach involves the server obtaining a session key or long-term key generated according to the stored security data. The server will then use this session key or long-term key to encrypt a document that is requested by the client device to generate the encrypted document. As such, in this approach, the client device would need to obtain the same session key or long-term key using the recovered security data and use this session key or long-term key to decrypt the encrypted document.

For example, let us assume that the security data KA (a session key) directly serves as the long-term key that decrypts a document. Thus, the server may use this session key to encrypt a document that is needed by Manufacturer A to generate an encrypted document. As such, the client device would need to use the recovered KA to locally decrypt the encrypted document.

The second example approach involves the server first obtaining a session key or long-term key generated according to the stored security data. The server will then use the session key or long-term key to encrypt a document-specific key that corresponds to a document that is requested by the client device. The server may use the document-specific key to encrypt the document to generate the encrypted document. Because the document is directly encrypted with its corresponding document-specific key, the server may encrypt this document once using its document-specific key and then store it for each subsequent time that it may be requested. As such, in this approach, the server would also need to send the encrypted document-specific key to the client device and the client device would need to obtain the same session key or long-term key using the recovered security data and then use this session key or long-term key to decrypt the encrypted document-specific key that it had also received from the server. Then the client device would be able to use the unencrypted document-specific key to decrypt the encrypted document.

For example, the server generates unique document-specific keys for all documents in order to encrypt them. For example, the document that is requested by Manufacturer A is a document whose ID is 10001. This document has the unique document-specific key of K10001. The server uses session key KA to encrypt K10001. Thus, Manufacturer A first uses the client application and session key KA to decrypt K10001, which it had also received from the server. Manufacturer A then uses the decrypted K10001 to decrypt the document. The advantage to doing this is that the next time a user requests document 10001 from the server, there is no need for the server to encrypt the document again because the server can simply retrieve the stored encrypted document from storage. Moreover, the server only needs to encrypt document 10001's document-specific key using the session key or long-term key that corresponds to that subsequent request. It is much more computationally efficient to encrypt a key than a document because the size of a key is typically much smaller than the size of a document. The session key or the long-term key that is generated for a group of authorized users (e.g., belonging to one organization or enterprise) can only be used to decrypt the document that is received by a user of that group.

Figure 5:
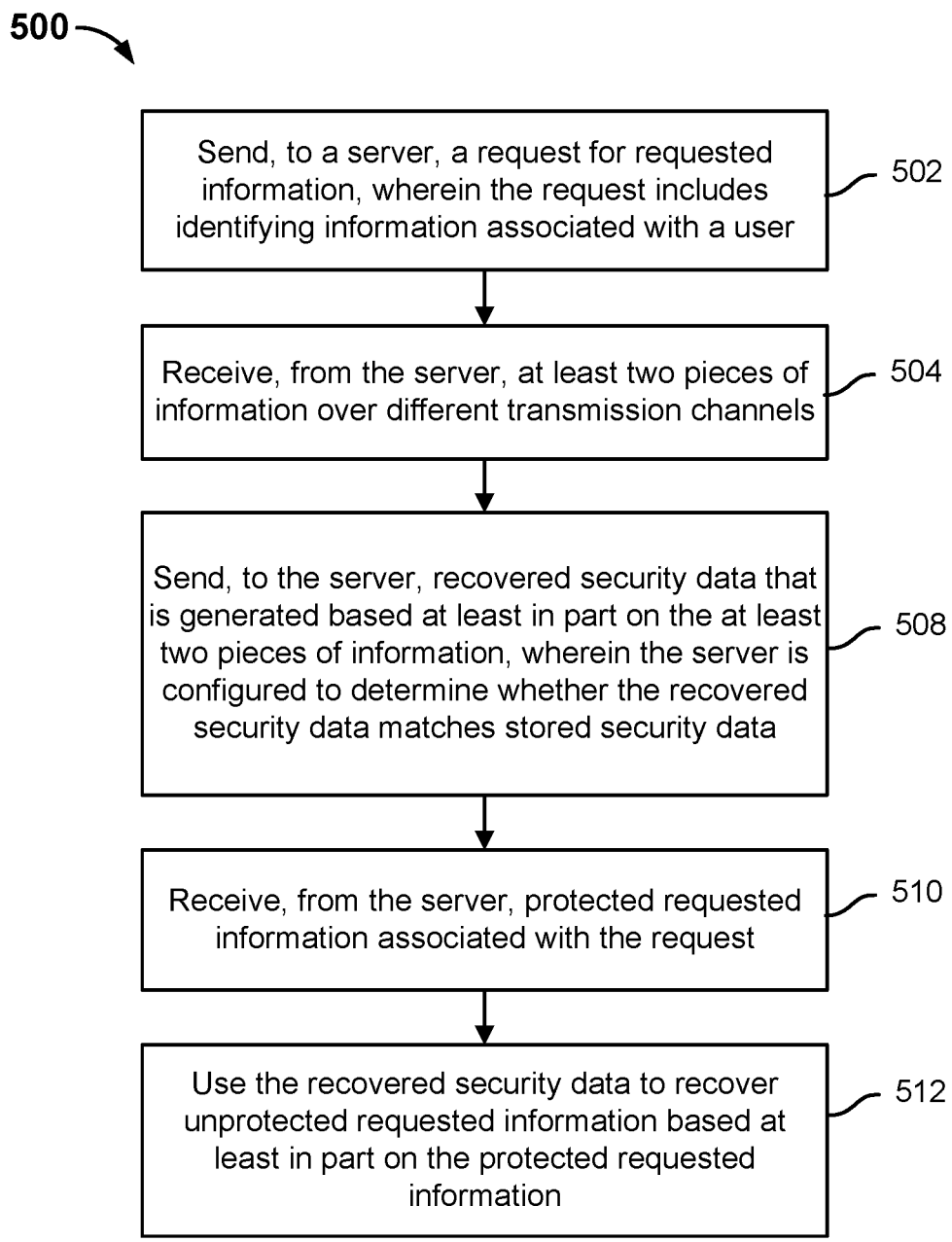
FIG. 5 is a flow diagram showing an embodiment of a process for obtaining sensitive data from a server.

FIG. 5 is a flow diagram showing an embodiment of a process for obtaining sensitive data from a server. In some embodiments, process 500 is implemented at one of client devices 102, 104, and 106 of system 100 of FIG. 1A.

At 502, a request for requested information is sent to a server, wherein the request includes identifying information associated with a user. In some embodiments, prior to the client application generating a request for requested information, the client application first authenticates the user of the device. In some embodiments, authenticating the user of the device comprises obtaining a biometric attribute from the user (e.g., using a camera or a sensor) and comparing the obtained biometric attribute to a stored biometric attribute. If there is a match between the obtained biometric attribute and the stored biometric attribute, then the client application determines that the user can be authenticated. Examples of a biometric attribute include a facial feature, a fingerprint feature, and pupil features.

In some embodiments, the identifying information associated with the user may include the user's name, the user's IP address, an alphanumeric ID associated with the user, or an attribute associated with the client device that is associated with the user.

At 504, at least two pieces of information are received over different transmission channels.

Different pieces of information are received via at least two different transmission channels at the client device. Example transmission channels may include instant messaging, cellular mobile communication, and email. The user may input transmission channel information when registering at the client application. As mentioned above, example input transmission channel information includes: a mobile phone number, instant messaging channel 1 account number, instant messaging channel 2 account number, and an email address.

Each transmission channel is associated with a corresponding application at the client device. The user would need to have the correct credentials to log in into each such application in order to view and/or provide the sensitive information application procuring client application access to the piece of information that is received by that application. As such, if the user that is currently requesting sensitive information was not the same user that had previously registered information with the server and/or also did not have the correct credentials to access the accounts associated with transmission channel information that was previously submitted to the server, then the requesting user is presumably not an authorized user and therefore would not be able to view the pieces of information to proceed in obtaining the sensitive information.

At 508, recovered security data that is generated based at least in part on the at least two pieces of information is sent to the server, wherein the server is configured to determine whether the recovered security data matches stored security data.

In a first example, the number of the pieces of information may be two or more, and each information piece is a part of the information of security data that is sent by the server. For example, the client device may obtain the information pieces "12," "34," "56," and "78" issued via four different transmission channels by the server to the user accounts that were provided by a user during the registration process. For example, the pieces of information may be submitted to the server by the user inputting the pieces of information into a user interface for sending the recovered security data to the server. In another example, the recovered security data that is made of the pieces of information may be submitted to the server by the sensitive information application procuring client application that had programmatically obtained (e.g., and correctly rearranged) the pieces of information across the applications associated with the transmission channels over which they were sent by the server.

In a second example, the number of information pieces is two, where one piece of information is encrypted security data, and the other piece of information is information for decrypting the encrypted security data. For example, the sensitive information application procuring client application is configured to programmatically use the information for decrypting the encrypted security data to decrypt the encrypted security data and populate the recovered security data in a user interface for sending the recovered security data to the server.

The server is configured to recover security data to the stored security data. If the recovered security data matches the stored security data, the server is configured to send a corresponding successful match result to the client. The server will also send the protected document if the recovered security data matches the stored security data. Otherwise, if the recovered security data does not match the stored security data, the server is configured to send a corresponding failed match result to the client. The server will also not send the protected document if the recovered security data does not match the stored security data.

At 510, protected requested information associated with the request is received.

In the event that the server had determined that the recovered security data matched the stored security data, the server will permit a protected version of the requested document to be sent to the client device. In some embodiments, a "protected version" of a document or a "protected document" is a non-human readable document whose content is not readily discernible by a human, such as, for example, an encrypted document. In some embodiments, an encrypted document is downloaded by the client device from the server. In some embodiments, an encrypted document is pushed by the server down to the client device. In some embodiments, an encrypted document is forwarded to the client device from another client device.

At 512, the recovered security data is used to recover unprotected requested information based at least in part on the protected requested information.

In some embodiments, the recovered security data is used to obtain a session key that is used to obtain an unprotected version of the protected document. In some embodiments, the recovered security data is used to obtain a session key that is used to decrypt the encrypted document.

For example, the client device may obtain recovered security data through the user inputting the reconstructed value of "12345678" that comprises the following received pieces of information that were received across at least two transmission channels: "12," "34," "56," and "78."

In some embodiments, a session key has a preset length (e.g., 128 bits). However, given that the length of the recovered security data is not fixed, in some embodiments, the client device is configured to use a local key-generating module to receive the recovered security data as an input and to output a corresponding session key of the preset length. For example, the key-generating module includes a key derivation function (KDF) that may use a set of short and simple information pieces to generate a complex session key of a fixed length.

The generated session key may be considered as an ephemeral key, and so new session keys need to be generated again at intervals. Therefore, in some embodiments, the generated session key is further used as a basis to generate a long-term key for recovering an unprotected version of the protected document.

A first example of generating a long-term key from a session key is to simply directly use the session key as the long-term key for recovering an unprotected version of the protected document.

A second example of generating a long-term key from a session key includes randomly generating a symmetric key and using the generated session key to perform signature processing on the session key to obtain a key signature. The client device can also send the key signature to the server so that the server may also store a copy.

It should be noted that, although a long-term key may remain valid longer than an ephemeral key, a long-term key may not be as secure as a short-term key such as a session key. Each of the session key and the long-term key has its advantages. Therefore, in some embodiments, the client device may flexibly select the use of either the session key or the long-term key. For example, the server may choose to use a session key and to update it at fixed intervals or choose to generate a long-term key.

In some embodiments where the document is directly encrypted with the session key, the client device may directly decrypt (and parse) the encrypted document with the session key.

In some embodiments, the encrypted document is not directly encrypted with the session key but was rather subjected to a two-step encryption process. First, the document was encrypted with the document's unencrypted unique document-specific key. Then, the document's unique document-specific key was encrypted with the session key. In such a situation, the client device may first use the generated session key to decrypt the document's encrypted unique document-specific key, which was also obtained from the server or otherwise obtained, and then use the decrypted document's unique document-specific key to decrypt (and parse) the document.

For example, where the encrypted document is not directly encrypted with the session key, the server generates unique keys for all documents in order to encrypt them. For example, the document needed by Manufacturer A is a document whose ID is 10001. This document has the unique key of K10001. The server then uses session key KA to encrypt the document-specific key of K10001. Thus, a client device that is associated with a user that is associated with Manufacturer A is to first use the client application and session key KA to decrypt the encrypted version of K10001 and then use the decrypted version of K10001 to decrypt the document.

In some embodiments, the decrypted version of the document is presented at the display screen of the client device. In some embodiments, a pattern (e.g., watermark) that includes identifying information associated with the requesting user of the document is added to the decrypted version of the document. As such, any time that the document is shared with another user, the identity of the source user can be determined from the watermark. In some embodiments, the decrypted version of the document is parsed and at least some of the parsed portions of the document can be recognized and programmatically used at the client device. For example, parsed portions of the document can be programmatically populated into certain form fields in a client application that is executing at the client device.

Figure 6:
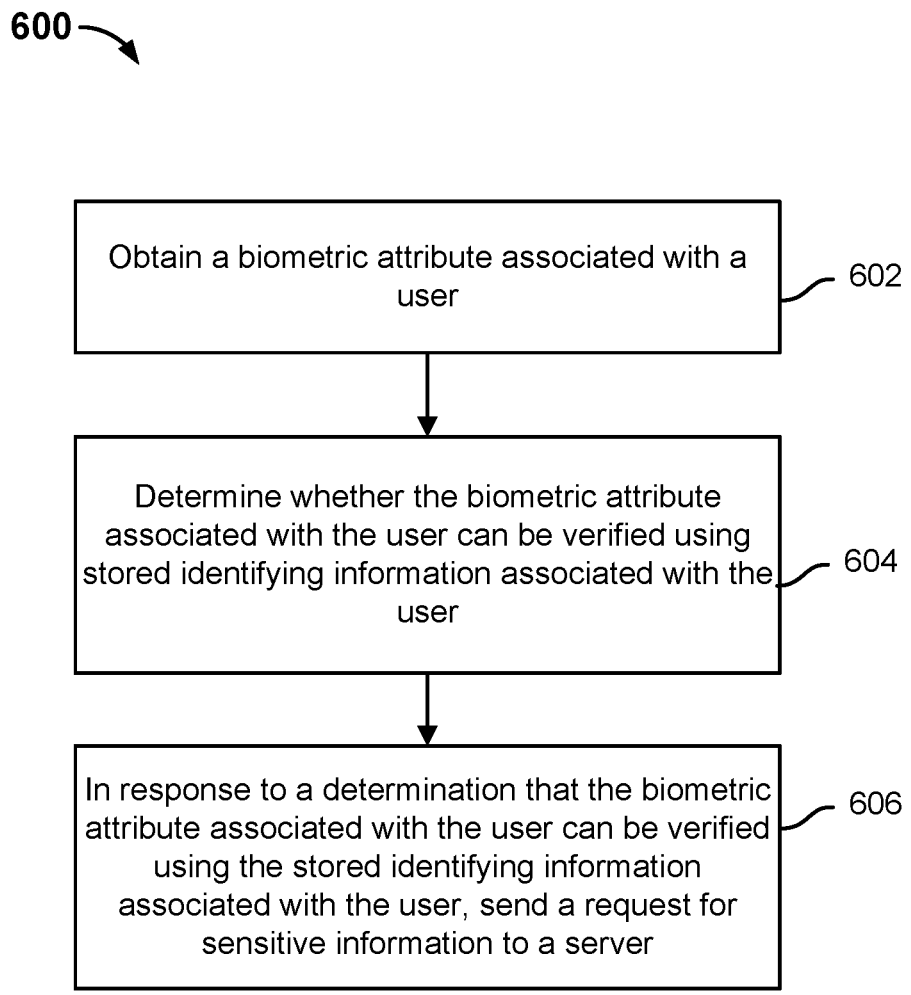
FIG. 6 is a flow diagram showing an example of a process for authenticating a user to a client application.

FIG. 6 is a flow diagram showing an example of a process for authenticating a user to a client application. In some embodiments, process 600 is implemented at one of client devices 102, 104, and 106 of system 100 of FIG. 1A.

In some embodiments, process 600 at a client device is processed before process 500 of FIG. 5 to make sure that a user that wishes to send a request for requested (e.g., sensitive) information to a server is authorized to even use the client application that is configured to issue such a request.

At 602, a biometric attribute associated with a user is obtained. Examples of a biometric attribute include a photo of a user's physical attribute (e.g., face), a fingerprint, or a pupil (e.g., iris) scan. In some embodiments, the biometric attribute can be captured by a camera, a sensor, or a reader.

At 604, whether the biometric attribute associated with the user can be verified using stored identifying information associated with the user is determined. The captured biometric attribute can be compared to a stored biometric attribute. In some embodiments, biometric attributes associated with the user may have been submitted by the user during a prior registration process and are stored at the server. In some embodiments, biometric attributes associated with the user may have been input by the user into the client device and are therefore stored at the client device. The captured biometric attribute can be compared to a biometric attribute that is stored at either the client device or the server.

At 606, in response to a determination that the biometric attribute associated with the user can be verified using the stored identifying information associated with the user, a request for sensitive information is sent to the server. If the captured biometric attribute matches a stored biometric attribute, then the user is authenticated with respect to the client application that is configured to send the request for the sensitive information to the server.

Figure 7:
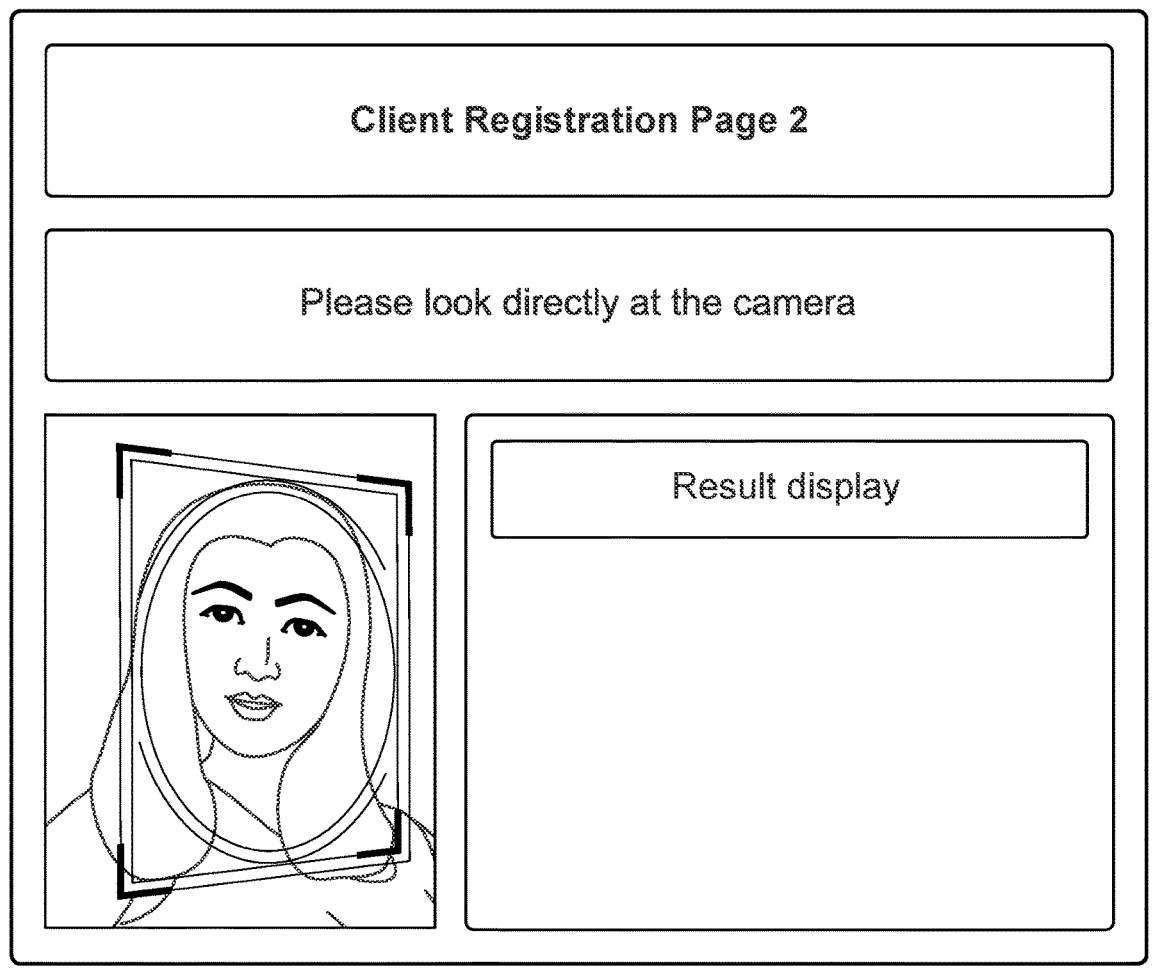
FIG. 7 is a diagram of a client registration page in a process for issuing a request for requested information to a server.

FIG. 7 is a diagram of a client registration page in a process for issuing a request for requested information to a server. In the example of user interface 700, the user is instructed to look at a camera that is included in the client device. The camera will then perform facial recognition on the user (e.g., by taking one or more photos of the user's face and comparing them or features thereof to previously obtained photos of the user's face). In some embodiments, to perform authentication of the user, the client device locally performs facial recognizing by comparing the photos of the user's face or features thereof to previously obtained photos of the user's face. In some embodiments, to perform authentication of the user, the client device sends the photos of the user's face to a server and the server performs facial recognition by comparing the photos of the user's face or features thereof to previously obtained photos of the user's face. If the photos of the user's face or features thereof match those of previously obtained photos of the user's face, then the user can be authenticated. Otherwise, if the photos of the user's face or features thereof do not match to previously obtained photos of the user's face, then the user cannot be authenticated. In some embodiments, if facial recognition fails three times, then activation is locked for the client application. If facial recognition succeeds, then the client application associated with user interface 700 is configured to send a request for sensitive information to a server.

Figure 8:
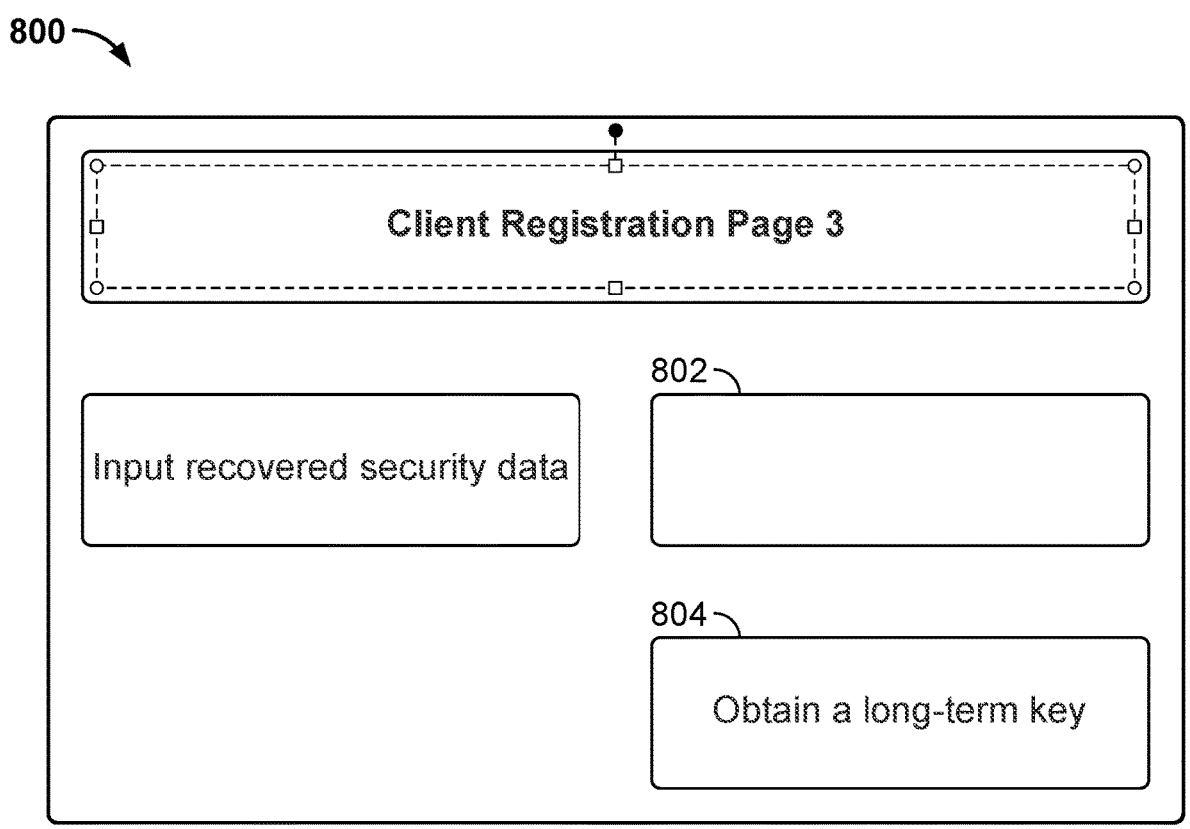
FIG. 8 is a diagram of another client registration page in a process for issuing a request for requested information to a server.

FIG. 8 is a diagram of another client registration page in a process for issuing a request for requested information to a server. In the example of user interface 800, the user is instructed to input the recovered security data in input box 802. After inputting the recovered security data into input box 802, the client application will send the input recovered security data to the server. The server will send back to the client device a comparison result of whether the recovered security data matched its stored security data. The comparison result may be presented over user interface 800 as an overlay, for example. In the event that the determination sent by the comparison result indicated that the recovered security data matched its stored security data, then the user may select button 804 to obtain a long-term key based at least in part on the recovered security data as described herein according to some embodiments.

Figure 9:
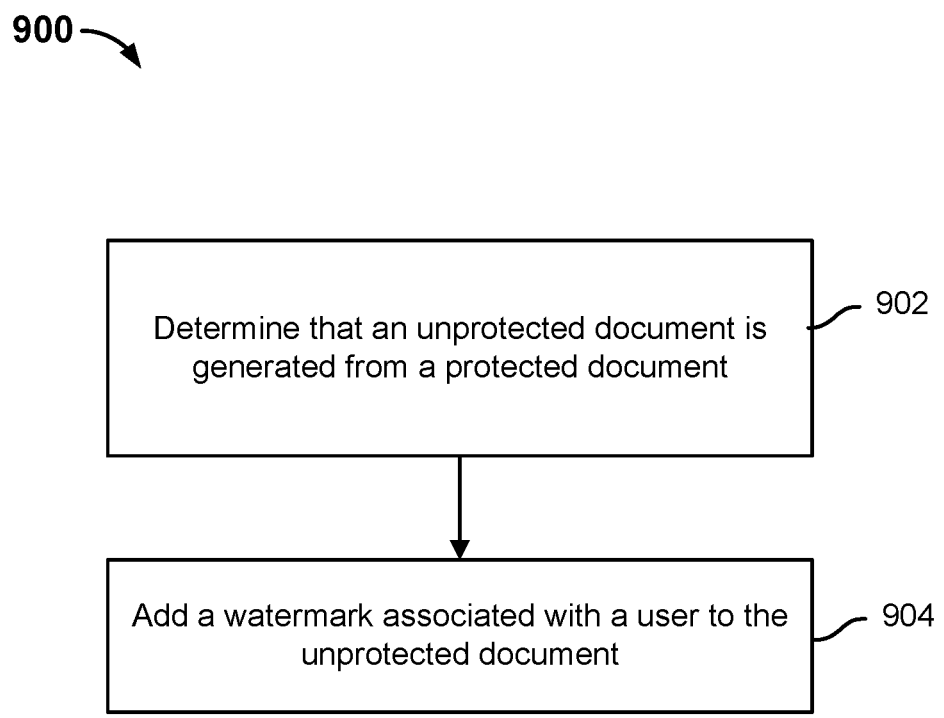
FIG. 9 is a flow diagram showing an example of a process for adding a pattern associated with user identifying information to a recovered document.

FIG. 9 is a flow diagram showing an example of a process for adding a pattern associated with user identifying information to a recovered document. In some embodiments, process 900 is implemented at one of client devices 102, 104, and 106 of system 100 of FIG. 1A.

In some embodiments, in order to prevent a user that is authorized to view a document with sensitive information from sending the document to another, unauthorized user in a way without being able to trace the source of the leak, an authorized user's identifying information is embedded into a recovered (e.g., decrypted) version of the document. The user's identifying information may include the user's name or an alphanumeric ID associated with the user. In some embodiments, the user's identifying information is embedded as a watermark in an unprotected document. For example, the watermark is a pattern that is added to the unprotected version of the document, which even an unauthorized user can view without needing to decrypt the document using security data that is received from a server. For example, during the process of parsing or presenting the document, the client device may use a watermark embedding module built into the client device to embed unique identity authentication information (e.g., if the user belonged to an enterprise: an organization credit code, or if the user was an individual: identification card number) of the current authorized user, the currently accessed IP address, or other such information.

At 902, an unprotected document is determined from a protected document. In some embodiments, the unprotected document that is determined from a protected document is a decrypted version of an encrypted document.

At 904, a watermark associated with the user is added to the unprotected document. Because the unprotected document can be opened and viewed by any user, not just authorized users, by adding a watermark associated with the authorized user to the unprotected document, the identity of the authorized user that had leaked the document may always be easily determined from the watermark on the document.

Figure 10:
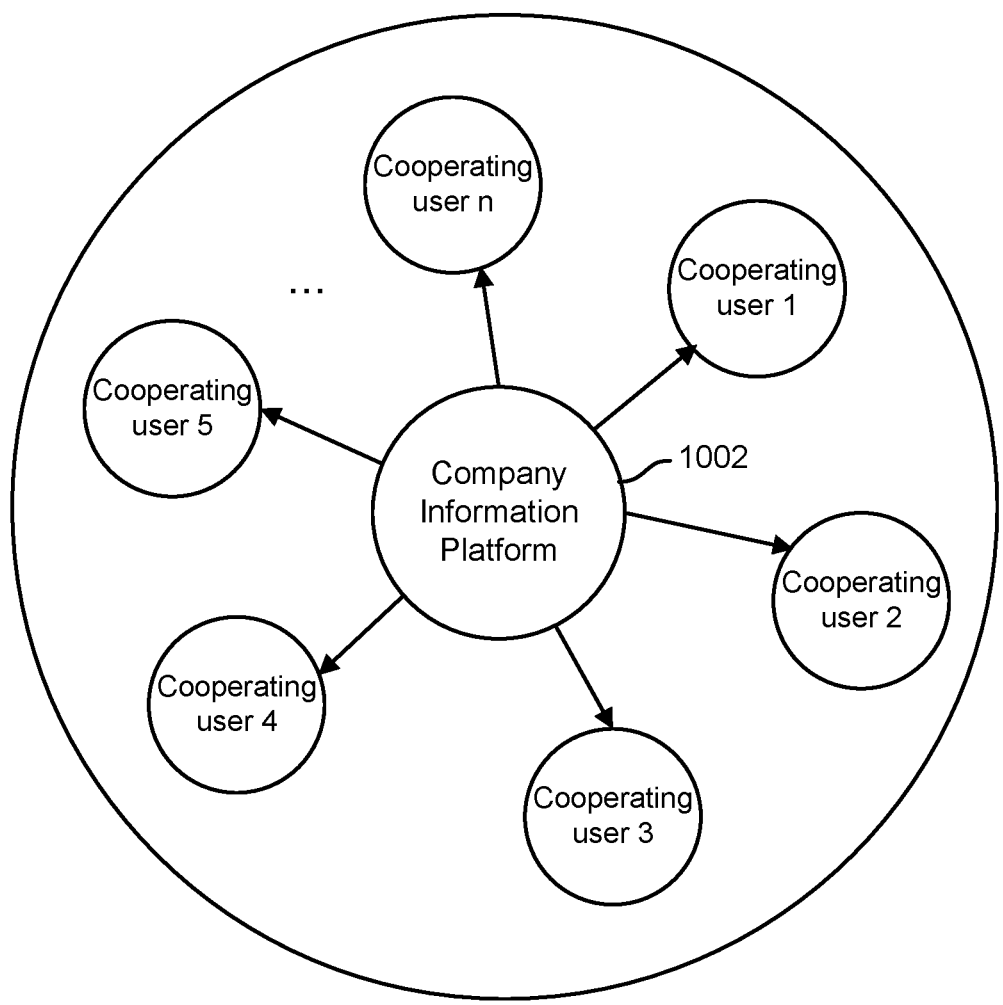
FIG. 10 is a diagram showing an example application of various embodiments described herein.

FIG. 10 is a diagram showing an example application of various embodiments described herein. In the example of FIG. 10, company information platform 1002 represents a party that may operate a platform executing on a corresponding server to send documents with sensitive information to requesting client devices. Each requesting client device in the example of FIG. 10 is shown as one of "Cooperating user" 1 through n. For example, server 110 of system 100 of FIG. 1A may be used to implement company information platform 1002 of FIG. 10 and each of client devices 102, 104, and 106 of system 100 of FIG. 1A may be used to implement a corresponding one of Cooperating users 1 through n of FIG. 10. For example, a cooperating user may be associated with a particular manufacturer that is cooperating with (e.g., has a contractual obligation to) company information platform 1002. In a specific example, in the process of cooperating with Manufacturer A, company information platform 1002 needs to send a protected document relating to proprietary commercial information to Manufacturer A. If Manufacturer A wishes to receive the protected document and smoothly view an unprotected version of the document, it will have to perform the steps below:

1. Go to the website provided by company information platform 1002 and download a software client application.

2. Use the software client application to request and obtain a document with sensitive information (e.g., using a process such as process 500 of FIG. 5). An unprotected version of the received (e.g., initially, encrypted) document will be presented at the client device. Specifically, during the registration process, the user associated with the client device associated with Manufacturer A inputs into the client application his or her own information, including phone number, instant messaging channel 1 account number, mailbox, instant messaging channel 2 account number, and instant messaging channel 3 account number, for example. The camera on the client device may then start to capture an image of the user's face (e.g., after the user taps the activation button). If facial recognition authentication fails after three attempts (or within a limited period of time), the client application will cause the following message to pop up: "The current person is not authorized to use this client." If the facial recognition succeeds, the client application provides this result as feedback to the server associated with company information platform 1002. The server divides the stored security data, which is the string of numbers "12345678," into multiple pieces and sends the pieces across at least some of the various channels for which information was provided by the user: mobile phone, instant messaging channel 1, instant messaging channel 2, and instant messaging channel 3. Assume the following example simple mode of distribution: the phone receives "12," instant messaging channel 1 receives "34," instant messaging channel 2 receives "56", and instant messaging channel 3 receives "78." Moreover, the user is prompted on the page to enter the entire recovered security data. Then the server checks whether the recovered security data entered by the user is the same as the security data that was issued by the server. If they are the same, the key derivation function (KDF) built into the client application uses the recovered security data to generate a session key, KA. Assume that the session key KA directly serves as a long-term key for decrypting the received encrypted document. Thus, the server also uses this session key to encrypt the document that was requested by Manufacturer A and sends the encrypted document to the user associated with Manufacturer A's client device. The user associated with Manufacturer A now may use the client application and session key KA to decrypt the document. Alternatively, this step may also proceed as follows: The company generates unique keys to encrypt all documents. For example, Manufacturer A requests the document whose ID is 10001. This document has the unique document-specific key K10001. The server uses KA to encrypt K10001. Thus, the user associated with Manufacturer A first uses the client applications and KA to decrypt the encrypted version of K10001, which the client device also received, and then uses the decrypted version of K10001 to decrypt the document. The advantage to doing this is that the next time, when another user subsequently requests document 10001, there is no need to encrypt the document again, but rather only document 10001's unique document-specific key is encrypted. It is much easier (e.g., computationally efficient) to encrypt a key than a document due to the typically smaller size of the key than the document. The key generated for Manufacturer A can only be used to decrypt the document received by Manufacturer A.

3. The client has a built-in watermark embedding function. When/after the document is being parsed/decrypted, the unique ID information of the user will be used to embed a watermark in the document.

4. The user of Manufacturer A is subjected to fine-grained authorization controls based on his or her creditability or other measures from past cooperation experiences in order to decide whether the user can perform export, print, edit, or other such operations on the document with sensitive information. Assume that no leaking of secret documents has occurred with respect to past documents that have been transmitted from company information platform 1002 to Manufacturer A. Thus, a user associated with Manufacturer A may be granted more operations to perform on the document. If there was prior document-leaking behavior, then a user associated with Manufacturer A would be permitted to only view subsequently transmitted documents with sensitive information.

5. If a leaked document is subsequently discovered in an external setting (e.g., on the device of an unauthorized user), the embedded watermark may be extracted to obtain the unique ID of the manufacturer who leaked the document and to trace the leaked document to its source.

Figure 11:
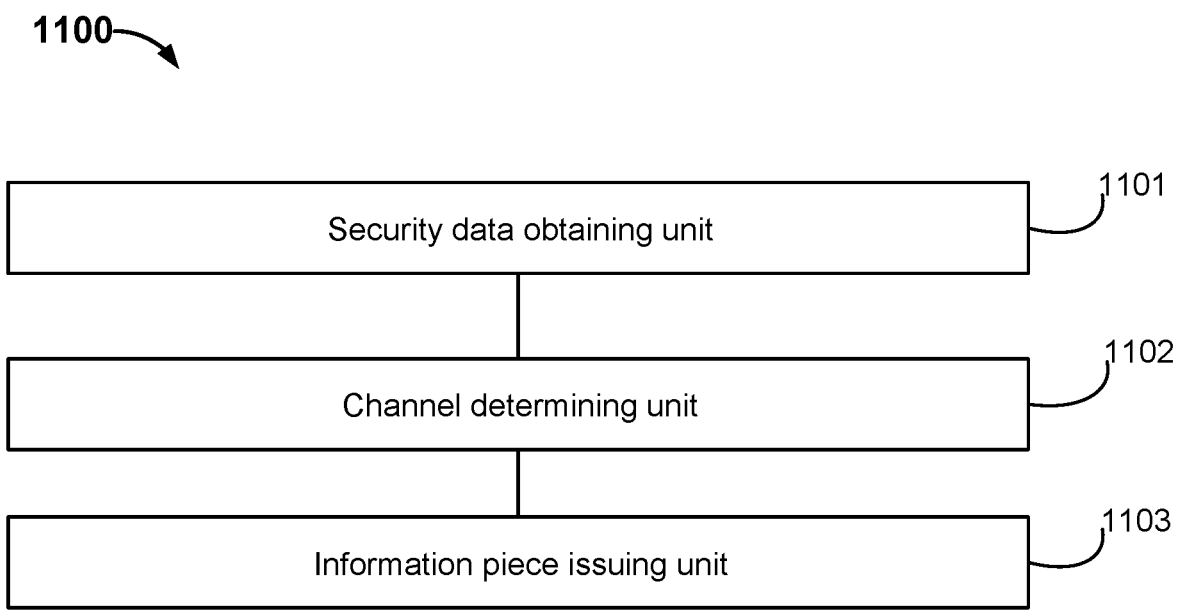
FIG. 11 is a diagram showing an embodiment of a server for providing documents with requested information.

FIG. 11 is a diagram showing an embodiment of a server for providing documents with requested information. As shown in FIG. 11, server 1100 includes security data obtaining unit 1101, channel determining unit 1102, and information piece issuing unit 1103.

The modules, sub-modules, and units described herein can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules, sub-modules, and units may be implemented on a single device or distributed across multiple devices.

Security data obtaining unit 1101 is configured to obtain stored security data corresponding to a document with sensitive information that is requested by a client device.

Channel determining unit 1102 is configured to determine at least two transmission channels for sending the security data.

Information piece issuing unit 1103 is configured to issue information pieces of the security data via the at least two transmission channels.

In some embodiments, the channel determining unit is further configured to:

Receive, from a client device, a request for requested information, wherein the request includes identifying information associated with a user;

Use the identifying information associated with the user to determine at least two transmission channels associated with the user;

Send, to the client device, a plurality of pieces of information associated with stored security data over the at least two transmission channels associated with the user;

Receive, from the client device, recovered security data that is generated based at least in part on the first piece of information and the second piece of information;

Determine whether the recovered security data matches the stored security data; and In response to a determination that the recovered security data matches the stored security data, send a protected document associated with the request to the client, wherein the recovered security data is usable by the client to recover an unprotected document based at least in part on the protected document.

In some embodiments, information piece issuing unit 1103 is further configured to:

Divide the security data into multiple information pieces according to the number of the at least two transmission channels;

Issue each information piece of the multiple information pieces individually via one channel of the at least two channels.

In some embodiments, the information pieces of the security data are encrypted security data and also information for decrypting the encrypted security data.

In some embodiments, information piece issuing unit 1103 is specifically configured to:

Issue the encrypted security data via a first transmission channel;

Issue the information for decrypting the encrypted security data via a second transmission channel.

In some embodiments, server 1100 further comprises:

An information piece receiving unit that is configured to receive at least one information piece sent by the client device.

A match result obtaining unit that is configured to determine whether the at least one information piece sent by the client device matches information pieces of the security data and obtain a match result.

A match result sending unit that is configured to send the match result to the client device.

In some embodiments, server 1100 further comprises:

A key obtaining unit that is configured to obtain a session key or a long-term key generated according to the security data and sent by the client device.

A document encrypting unit that is configured to use the session key or the long-term key to encrypt a document that is requested by the client device and generate the encrypted document.

In some embodiments, server 1100 further comprises:

A key obtaining unit that is configured to obtain a session key or a long-term key generated according to the security data and sent by the client device.

A key encrypting unit that is configured to use the session key or the long-term key to encrypt the key for a document that is requested by the client device.

Figure 12:
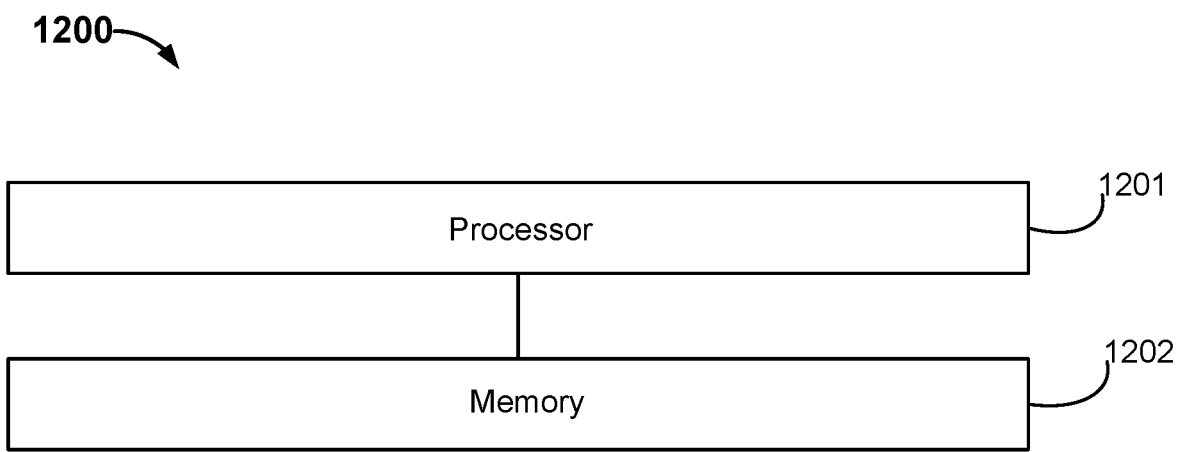
FIG. 12 is a diagram showing an embodiment of a client device for requesting documents with requested information.

FIG. 12 is a diagram showing an embodiment of a client device for requesting documents with requested information. In the example of FIG. 12, client device 1200 includes processor 1201 and memory 1202.

Memory 1202 is configured to store computer instructions. After client device 1200 is powered up, memory 1202 is configured to provide processor 1201 with instructions which when executed cause processor 1201 to:

Send, to a server, a request for requested information, wherein the request includes identifying information associated with a user;

Receive, from the server, a first piece of information over a first transmission channel;

Receive, from the server, a second piece of information over a second transmission channel;

Send, to the server, recovered security data that is generated based at least in part on the first piece of information and the second piece of information, wherein the server is configured to determine whether the recovered security data matches stored security data;

Receive, from the server, a protected document associated with the request; and

Use the recovered security data to recover an unprotected document based at least in part on the protected document.

Figure 13:
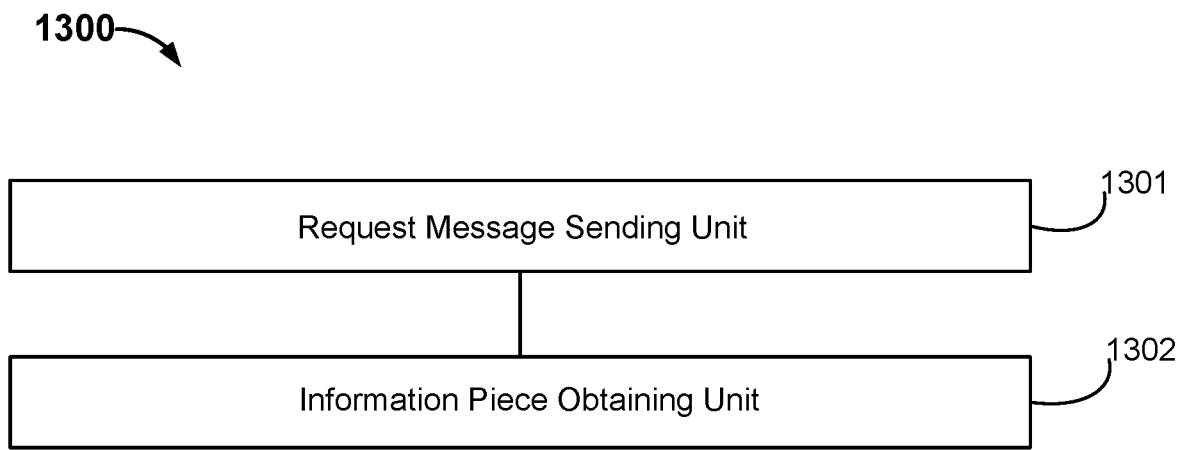
FIG. 13 is a diagram showing an embodiment of a system for requesting documents with requested information.

FIG. 13 is a diagram showing an embodiment of a system for requesting documents with requested information. In the example of FIG. 13, system 1300 includes request message sending unit 1301 and information piece obtaining unit 1302.

Request message sending unit 1301 is configured to send a request message to a server for a document with sensitive information.

Information piece obtaining unit 1302 is configured to obtain information pieces of stored security data.

In some embodiments, system 1300 further comprises: a session key generating unit that is configured to use the information pieces as a basis to generate a session key for decrypting the encrypted document.

In some embodiments, the session key generating unit is further configured to:

Determine whether the information pieces are information pieces of the security data that is sent by the server.

If the server sends a match result that the recovered security data matches the sent security data, use the information pieces as a basis to generate a session key for decrypting the encrypted document.

In some embodiments, the session key generating unit is further configured to:

Generate a session key whose length attains a preset length according to the set of the information pieces.

In some embodiments, system 1300 further comprises:

A long-term key generating unit that is configured to use the session key as a basis to generate a long-term key for decrypting the encrypted document.

In some embodiments, the long-term key generating unit is further configured to:

Use the session key as a long-term key for decrypting the encrypted document.

In some embodiments, the long-term key generating unit is further configured to:

Randomly generate a symmetric key;

Use the session key to perform signature processing on the symmetric key and obtain a key signature;

Send the key signature to the server.

In some embodiments, the request message sending unit is configured to:

Authenticate user information;

Upon determining that the user information has been successfully authenticated, send a request message to a server to request that the server send security data via at least two transmission channels.

In some embodiments, the request message sending unit is configured to:

Use user biometric information for authentication.

For example, the biometric information includes at least one of the following types of feature information: facial features, fingerprint features, pupil features.

In some embodiments, system 1300 further comprises:

An encrypted document downloading unit that is configured to download an encrypted document from the server; or An encrypted document pushing unit that is configured to receive an encrypted document pushed by the server; or An encrypted document forwarding unit that is configured to obtain an encrypted document forwarded from a different client device.

In some embodiments, system 1300 further comprises:

An encrypted document parsing unit that is configured to decrypt the encrypted document according to the session key.

In some embodiments, system 1300 further comprises:

A watermark embedding unit that is configured to embed user ID information as a watermark in the document during the process of decrypting the encrypted document.

Figure 14:
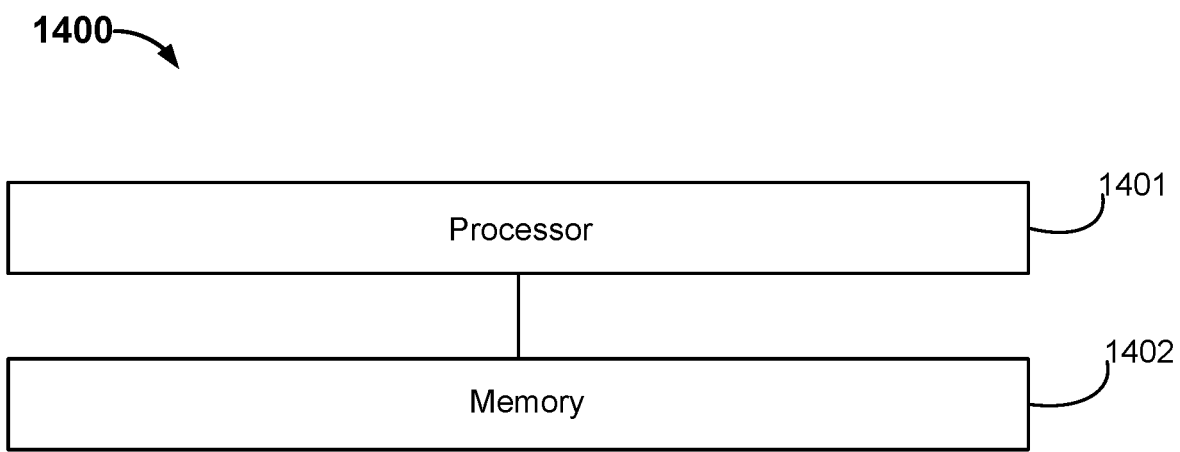
FIG. 14 is a diagram showing an embodiment of a server for requesting documents with requested information.

FIG. 14 is a diagram showing an embodiment of a server for requesting documents with requested information. In the example of FIG. 14, server 1400 includes processor 1401 and memory 1402.

Memory 1402 is configured to store computer instructions. After server 1400 is powered up, memory 1402 is configured to provide processor 1401 with instructions which when executed cause processor 1401 to:

Receive, from a client device, a request for sensitive information, wherein the request includes identifying information associated with a user;

Use the identifying information associated with the user to determine at least two transmission channels associated with the user;

Send, to the client device, a plurality of pieces of information associated with stored security data over the at least two transmission channels associated with the user;

Receive, from the client device, recovered security data that is generated based at least in part on a first piece of information and a second piece of information;

Determine whether the recovered security data matches the stored security data; and Although the present application uses preferred embodiments to disclose the above, they are not used to limit the present application. Any person skilled in the art may make possible changes and modifications without departing from the spirit and scope of the present application. Therefore, the scope of protection of the present application shall be the scope delimited by the claims of the present application.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media does not include non-temporary computer-readable media (transitory media) such as modulated data signals and carrier waves.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
one or more memories; and
one or more hardware processors coupled to the one or more memories and configured to:
  send, to a server, a request for requested information, wherein the request includes identifying information associated with a user;
  receive, from the server, a plurality of pieces of information over different transmission channels, wherein the plurality of pieces of information includes a first piece of information and a second piece of information, wherein the different transmission channels include a first transmission channel and a second transmission channel, and wherein the receiving of the plurality of pieces of information comprises to:
  receive the first piece of information over the first transmission channel, wherein the first piece of information corresponds with a first part of security data, wherein the second piece of information corresponds with a second part of security data, wherein a third piece of information corresponds with a third part of security data, wherein the different transmission channels include a third transmission channel, and wherein the plurality of pieces of information include the third piece of information;
  receive the second piece of information over the second transmission channel, wherein the second piece of information corresponds with second part of the security data; and receive the third piece of information over the third transmission channel, wherein the first piece of information includes a first sequence number, wherein the second piece of information includes a second sequence number, wherein the third piece of information includes a third sequence number, and wherein the first sequence number, the second sequence number, and the third sequence number are used to order the first piece of information, the second piece of information, and the third piece of information to recover security data;

send, to the server, the recovered security data that is generated based at least in part on the plurality of pieces of information, wherein the server is configured to determine whether the recovered security data matches stored security data;

receive, from the server, protected requested information associated with the request;

use the recovered security data to recover unprotected requested information based at least in part on the protected requested information; and embed a watermark in the unprotected requested information using a watermark embedding module at the device, wherein the watermark comprises the identifying information associated with the user.

2. The device of claim 1, wherein the one or more hardware processors are further configured to:
obtain a biometric attribute associated with the user; and
determine whether the biometric attribute associated with the user can be verified using stored identifying information associated with the user.

3. The device of claim 2, wherein the biometric attribute comprises one or more of the following: a facial feature, a fingerprint feature, and a pupil feature.

4. The device of claim 1, wherein the one or more hardware processors are further configured to present a first piece of information of the plurality of pieces of information at a first user interface of a first client application corresponding to a first transmission channel.

5. The device of claim 1, wherein the one or more hardware processors are further configured to present a second piece of information of the plurality of pieces of information at a second user interface of a second client application corresponding to a second transmission channel.

6. The device of claim 1, wherein to use the recovered security data to determine the determined key comprises to input the recovered security data into a function that generates outputs of a preset length.

7. The device of claim 1, wherein the protected requested information comprises an encrypted document, wherein to use the recovered security data to recover the unprotected requested information based at least in part on the protected requested information comprises to:
use the recovered security data to determine a determined key;
receive an encrypted document-specific key;
use the determined key to decrypt the encrypted document-specific key; and
use the decrypted document-specific key to decrypt the encrypted document.

8. The device of claim 1, wherein the first transmission channel is associated with a first application that is accessible using a first set of authentication credentials and the second transmission channel is associated with a second application that is accessible using a second set of authentication credentials, and wherein the one or more hardware processors are further configured to:

obtain the request for requested information via a third application; and
wherein to send, to the server, the recovered security data that is generated based at least in part on the plurality of pieces of information, wherein the server is configured to determine whether the recovered security data matches stored security data comprises to:
combine the plurality of pieces of information into the recovered security data; and
submit the recovered security data to the server via the third application.

9. The device of claim 1, wherein the receiving of the plurality of pieces of information comprises to:
receive the first piece of information over the first transmission channel, wherein the first piece of information corresponds with encrypted security data; and
receive the second piece of information over the second transmission channel, wherein the second piece of information corresponds with information for decrypting the encrypted security data to recover the security data.

10. A method, comprising:
sending, to a server, a request for requested information, wherein the request includes identifying information associated with a user;
receiving, from the server, a plurality of pieces of information over different transmission channels, wherein the plurality of pieces of information includes a first piece of information and a second piece of information, wherein the different transmission channels include a first transmission channel and a second transmission channel, and wherein the receiving of the plurality of pieces of information comprises:
receiving the first piece of information over the first transmission channel, wherein the first piece of information corresponds with a first part of security data, wherein the second piece of information corresponds with a second part of security data, wherein a third piece of information corresponds with a third part of security data, wherein the different transmission channels include a third transmission channel, and wherein the plurality of pieces of information include the third piece of information;
receiving the second piece of information over the second transmission channel, wherein the second piece of information corresponds with second part of the security data; and
receiving the third piece of information over the third transmission channel, wherein the first piece of information includes a first sequence number, wherein the second piece of information includes a second sequence number, wherein the third piece of information includes a third sequence number, and wherein the first sequence number, the second sequence number, and the third sequence number are used to order the first piece of information, the second piece of information, and the third piece of information to recover security data;
sending, to the server, the recovered security data that is generated based at least in part on the plurality of pieces of information, wherein the server is configured to determine whether the recovered security data matches stored security data;
receiving, from the server, protected requested information associated with the request;

using the recovered security data to recover unprotected requested information based at least in part on the protected requested information; and embedding a watermark in the unprotected requested information using a watermark embedding module at a client device, wherein the watermark comprises the identifying information associated with the user.

11. The method of claim 10, further comprising:

obtaining a biometric attribute associated with the user; and determining whether the biometric attribute associated with the user can be verified using stored identifying information associated with the user.

12. The method of claim 11, wherein the biometric attribute comprises one or more of the following: a facial feature, a fingerprint feature, and a pupil feature.

13. The method of claim 10, further comprising presenting a first piece of information of the plurality of pieces of information at a first user interface of a first client application corresponding to a first transmission channel.

14. The method of claim 10, further comprising presenting a second piece of information of the plurality of pieces of information at a second user interface of a second client application corresponding to a second transmission channel.

15. The method of claim 10, wherein the protected requested information comprises an encrypted document, wherein to use the recovered security data to recover the unprotected requested information based at least in part on the protected requested information comprises:

using the recovered security data to determine a determined key; and using the determined key to decrypt the encrypted document.

16. The method of claim 10, wherein the protected requested information comprises an encrypted document, wherein using the recovered security data to recover the unprotected requested information based at least in part on the protected requested information comprises:

using the recovered security data to determine a determined key;

receiving an encrypted document-specific key;

using the determined key to decrypt the encrypted document-specific key; and using the decrypted document-specific key to decrypt the encrypted document.

17. A server, comprising:

one or more memories; and one or more hardware processors coupled to the one or more memories and configured to:

receive, from a client device, a request for requested information, wherein the request includes identifying information associated with a user;

use the identifying information associated with the user to determine at least two transmission channels associated with the user;

send, to the client device, a plurality of pieces of information associated with stored security data over the at least two transmission channels associated with the user, wherein the plurality of pieces of information includes a first piece of information and a second piece of information, wherein the at least two transmission channels include a first transmission channel and a second transmission channel, and wherein the sending of the plurality of pieces of information comprises to:

send the first piece of information over the first transmission channel, wherein the first piece of information corresponds with a first part of security data, wherein the second piece of information corresponds with a second part of security data, wherein a third piece of information corresponds with a third part of security data, wherein the different transmission channels include a third transmission channel, and wherein the plurality of pieces of information include the third piece of information;

send the second piece of information over the second transmission channel, wherein the second piece of information corresponds with second part of the security data; and send the third piece of information over the third transmission channel, wherein the first piece of information includes a first sequence number, wherein the second piece of information includes a second sequence number, wherein the third piece of information includes a third sequence number, and wherein the first sequence number, the second sequence number, and the third sequence number are used to order the first piece of information, the second piece of information, and the third piece of information to recover security data;

receive, from the client device, the recovered security data that is generated based at least in part on the plurality of pieces of information;

determine whether the recovered security data matches the stored security data; and in response to a determination that the recovered security data matches the stored security data, send protected requested information associated with the request to the client device, wherein the recovered security data is usable by the client device to recover unprotected requested information based at least in part on the protected requested information, wherein a watermark is to be embedded into the unprotected requested information by the client device using a watermark embedding module at the client device, wherein the watermark comprises the identifying information associated with the user.

* * * * *